United States Patent
Scott et al.

(10) Patent No.: US 6,212,374 B1
(45) Date of Patent: Apr. 3, 2001

(54) DISABLING OF ECHO CANCELERS AFTER CALL STARTUP

(75) Inventors: Robert E. Scott, Largo; E. Robert Lastinger, Jr., Hillsborough, both of FL (US)

(73) Assignee: Paradyne Corporation, Largo, FL (US)

(*) Notice: Subject to any disclaimer, the term of this patent is extended or adjusted under 35 U.S.C. 154(b) by 0 days.

(21) Appl. No.: 09/013,573

(22) Filed: Jan. 27, 1998

Related U.S. Application Data

(60) Provisional application No. 60/050,502, filed on Jun. 23, 1997.

(51) Int. Cl.[7] .................................................. H04B 7/00
(52) U.S. Cl. ............................ 455/422; 455/436; 455/570
(58) Field of Search ................................. 455/422, 450, 455/507, 517, 550, 570, 575, 436; 379/389, 406, 409, 410

(56) References Cited

U.S. PATENT DOCUMENTS

| | | | |
|---|---|---|---|
| 5,416,829 | * 5/1995 | Umemoto | 455/570 |
| 5,911,124 | * 6/1999 | Doran | 455/570 |
| 6,002,950 | * 12/1999 | Muraoka | 455/570 |

* cited by examiner

*Primary Examiner*—Thanh Cong Le
(74) *Attorney, Agent, or Firm*—Scott A. Horstemeyer; Thomas, Kayden, Horstemeyer & Risley

(57) ABSTRACT

An echo canceler disabling system is associated with a cellular data communications device, such as a modem, which is utilized to communicate digital data over a cellular network for the purpose of enhancing digital data communications over the network. The echo canceler disabling system is configured to disable voice echo cancelers brought on-line during digital data transmission after call startup in order to prevent disruption of digital data communications by the voice echo cancelers. To deactivate the voice echo cancelers, the echo canceler disabling system is configured to transmit a tone at approximately 2100 Hz with 180 degree phase reversals to disable one or more echo cancelers brought on-line after the call startup. In architecture, the echo canceler disabling system includes a mechanism to detect a loss of signal synchronization, a mechanism to send an echo canceler disable tone, and a mechanism to send a retrain signal after the echo canceler disable tone is sent in order to reestablish signal synchronization.

15 Claims, 4 Drawing Sheets

DISABLING OF ECHO CANCELERS AFTER CALL STARTUP

CROSS-REFERENCE TO RELATED APPLICATION

The subject matter of this document claims priority to copending and commonly assigned U.S. provisional patent application entitled "Disabling of Echo Cancelers After Call Setup", filed on Jun. 23, 1997 and accorded serial number 60/050502 The foregoing document is incorporated herein by reference in its entirety.

FIELD OF INVENTION

This invention relates to the field of cellular network communications, and more particularly, to system and method for preventing adverse disruption of digital data communications over cellular networks by deactivating, when appropriate, voice echo cancelers that are associated with the cellular network

BACKGROUND OF THE INVENTION

Communication devices are becoming increasingly mobile with the proliferation of cellular telephone networks. These cellular networks now allow individuals to make a telephone call using the present public switched telephone network (PSTN) from virtually any location under their respective umbrellas of service.

This relatively new mobility is not restricted to voice communication. Computers and other digital data communications devices are used in remote locations for specific applications which access the PSTN via a cellular network. The computer may access the cellular network via a mobile station modem. Such applications may include, for example, a mobile station modem application used in remote diagnostics in which a remote computer station accesses a central mainframe computer system for particular applications such as, for example, remote digital data acquisition or transmittal.

The cellular networks may be digital and/or analog. The earliest cellular networks were analog employing frequency modulation techniques as known by those skilled in the art. However, as time progressed, the capacity of such networks could no longer meet demand. Digital cellular networks were then adopted that provided for greater capacity than the analog networks.

Digital cellular networks generally employ either time division multiple access techniques (TDMA) or code division multiple access techniques (CDMA), both of which are well known to those skilled in the art. These techniques generally introduce significant delay in the transmission of the voice signals due to the modulation tasks performed by the voice encoders resident in the network and in the mobile units as known to those skilled in the art. Such a delay can result in a significant echo signal which is heard by the talker on the mobile unit. In order to eliminate the echo, voice echo cancelers are activated and brought on-line when necessary.

The digital cellular networks generally assume that a voice signal is to be transmitted. The digital modulation techniques employed are typically designed specifically for voice and not digital data signals. Consequently, digital data signals generally are disrupted when transmitted using TDMA or CDMA techniques. Many of these digital cellular networks allow one to revert back to an analog cellular communication link in those particular cases when digital cellular networks cannot be used.

In the situation where a digital cellular network has defaulted to analog cellular communication, it is sometimes the case that voice echo cancelers that are used to prevent voice echo in a digital cellular networks are activated and brought on-line, even in the case of an analog cellular network link. These voice echo cancelers may disrupt digital data communication if on-line during digital data transmission, as is known to those skilled in the art.

To explain further, cellular networks include several predefined areas, or cells, that border each other. Each cell has its own transmitter and receiver to communicate with mobile cellular telephones. Generally, these transmitters and receivers facilitate several concurrent channels of analog voice communication, each channel having its own frequency.

As a cellular telephone that is in analog communication with the transmitter and receiver moves from cell to cell, the cell transmitter and receiver will hand off the communication link with the cellular telephone to the transmitter and receiver associated with the adjacent cell into which the cellular telephone has traveled. Also, it is possible that a handoff from one frequency channel to another may occur within a single cell due to, for example, interference caused by various obstructions as the network searches for a channel free of interference.

In the case of digital data communication, voice echo cancelers are disabled when a telephone call facilitating digital data transmission is first established to prevent digital data disruption as known by those skilled in the art. Note that the signals or other means used to disable echo cancelers are only used at the beginning of a telephone call. This methodology is employed because it is traditionally assumed that the circuit by which the telephone call is first established will not change throughout the duration of the telephone call. Thus, once echo cancelers are disabled at the beginning, it is generally assumed that there is no further need to disable the echo cancelers.

However, in the case of analog cellular networks operating in conjunction with a digital cellular network, an echo canceler may be introduced into the circuit after call initiation. Specifically, when a handoff occurs, the digital data transmission will be established using a new channel which may be a different channel within the same cell, or a channel in a new cell. In this situation, the new channel used may incorporate a new echo canceler which will cut off digital data communication.

Thus, a heretofore unaddressed need exits in the industry for providing a system and method for disabling voice echo concelers after call startup.

SUMMARY OF THE INVENTION

The present invention overcomes the inadequacies and deficiencies of the prior art as discussed herein. The present invention provides an echo canceler disabling system and method for enabling and optimizing digital data communications over a cellular network by preventing disruption of digital data communications caused by one or more voice echo cancelers associated with the network.

In essence, the system and method involve disabling voice echo cancelers brought on-line in the cellular network during digital data transmission due to handoffs of a cellular telephone call from one channel to another. In situations where an echo canceler is brought on-line after a handoff, which may disrupt digital data communications, the echo canceler disabling system executes a retrain sequence to reestablish digital data communication. According to the instant invention, an echo canceler disabling signal is included in the retrain sequence in order to disable any voice echo canceler that is brought on-line subsequent to the initiation of the telephone call due to handoffs. Any voice echo canceler that would be brought on-line after the handoff will thus be disabled by this signal.

The present invention can also be viewed as providing a method for enabling and optimizing digital data communications over a cellular network. Briefly described, the method can be broadly conceptualized by the following steps: losing a digital data communication link due to introduction of a voice echo canceler; initiating a retrain sequence to reestablish digital data communication link; transmitting an echo canceler disabling signal with a retrain sequence to disable any echo cancelers, and reestablishing the digital data communication link.

The invention has several advantages, a few of which are delineated hereafter, as mere examples.

An advantage of the invention is that it fully enables and optimizes digital data communications over cellular networks by eliminating the need to reestablish a link once it has been disrupted.

Another advantage of the invention is that it is simple in design and reliable in operation.

Another advantage of the invention is that it is easily implemented in connection with existing conventional cellular network designs, particularly in connection with a modem adapted to communicate digital data over a cellular network.

Other features and advantages of the present invention will become apparent to one with skill in the art upon examination of the following drawings and detailed description. It is intended that all such additional features and advantages be included herein within the scope of the present invention as defined by the claims.

BRIEF DESCRIPTION OF THE DRAWINGS

Here the invention can be better understood with reference to the following drawings. The components in the drawings are not necessarily to scale, emphasis instead being placed on clearly illustrating the principles of the present invention. In the drawings, like reference numerals designate corresponding parts throughout the several views.

DETAILED DESCRIPTION OF THE PREFERRED EMBODIMENT

Figure 1:
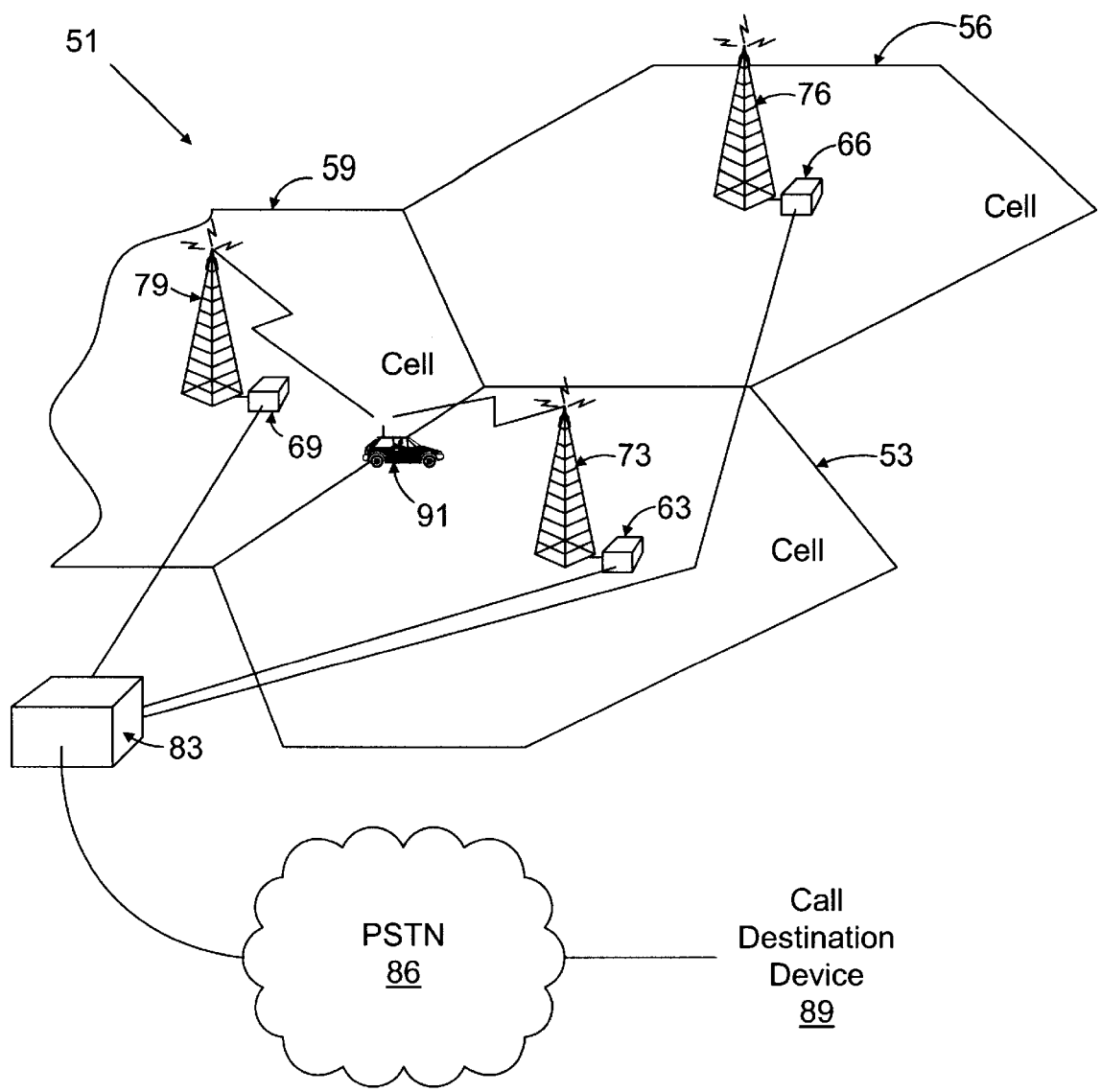
FIG. 1 is a schematic diagram illustrating a general overview of an exemplary cellular network in which the instant invention may be employed.

FIG. 1 depicts a typical cellular network 51 in which the instant invention may be employed. Included within the typical cellular network 51 are cells 53, 56, and 59 in which are located cell sites 63, 66, and 69. Radio antennas 73, 76, and 79 are electrically coupled to the cell sites 63, 66, and 69. The cell sites 63, 66, and 69 are also electrically coupled to a mobile switch 83, which in turn is coupled to a public switched telephone network (PSTN) 86. A telephone call initiated through the cellular network 51 will eventually reach a call destination device 89 via the public switched telephone network 86. The call destination device 89 may be any telephonic interface or other media linked to the public switched telephone network 86, such as a telephone, facsimile, computer or other device as known to those skilled in the art. Traveling from cell to cell in the network 51 is a mobile unit 91. In the exemplary case of FIG. 1, the mobile unit 91 is located within an automobile, but may also comprise a hand held unit or other mobile cellular unit as is well known in the industry.

Essentially, the cellular network 51 of FIG. 1 operates as follows. A telephone call is initiated and established between the mobile unit 91 and the call destination device 89. From the mobile unit 91, signals are transmitted through the air to the closest radio antenna 73, 76, or 79. The signals are then routed from the cell site 63, 66, or 69 connected to the respective radio antenna 73, 76, or 79 which receives the signals from the mobile unit 91. From the respective cell site 63, 66, or 69, the signals are routed to the mobile switch 83, and then through the PSTN 86 to the ultimate call destination device 89.

As the mobile unit 91 travels from cell to cell, the particular radio antenna 73, 76, or 79 and accompanying cell site 63, 66, or 69 through which the signals are routed will be switched to the radio antenna and cell site of the cell 53, 56, or 59 into which the mobile unit 91 travels. Thus, several radio antennas 73, 76, and/or 79 may be employed in the course of a single cellular telephone call, depending upon how many different cells 53, 56, and/or 59 into which the mobile unit 91 travels. The switching of a telephone call from one cell to the next adjacent cell is customarily referred to in the art as a "handoff".

Figure 2:
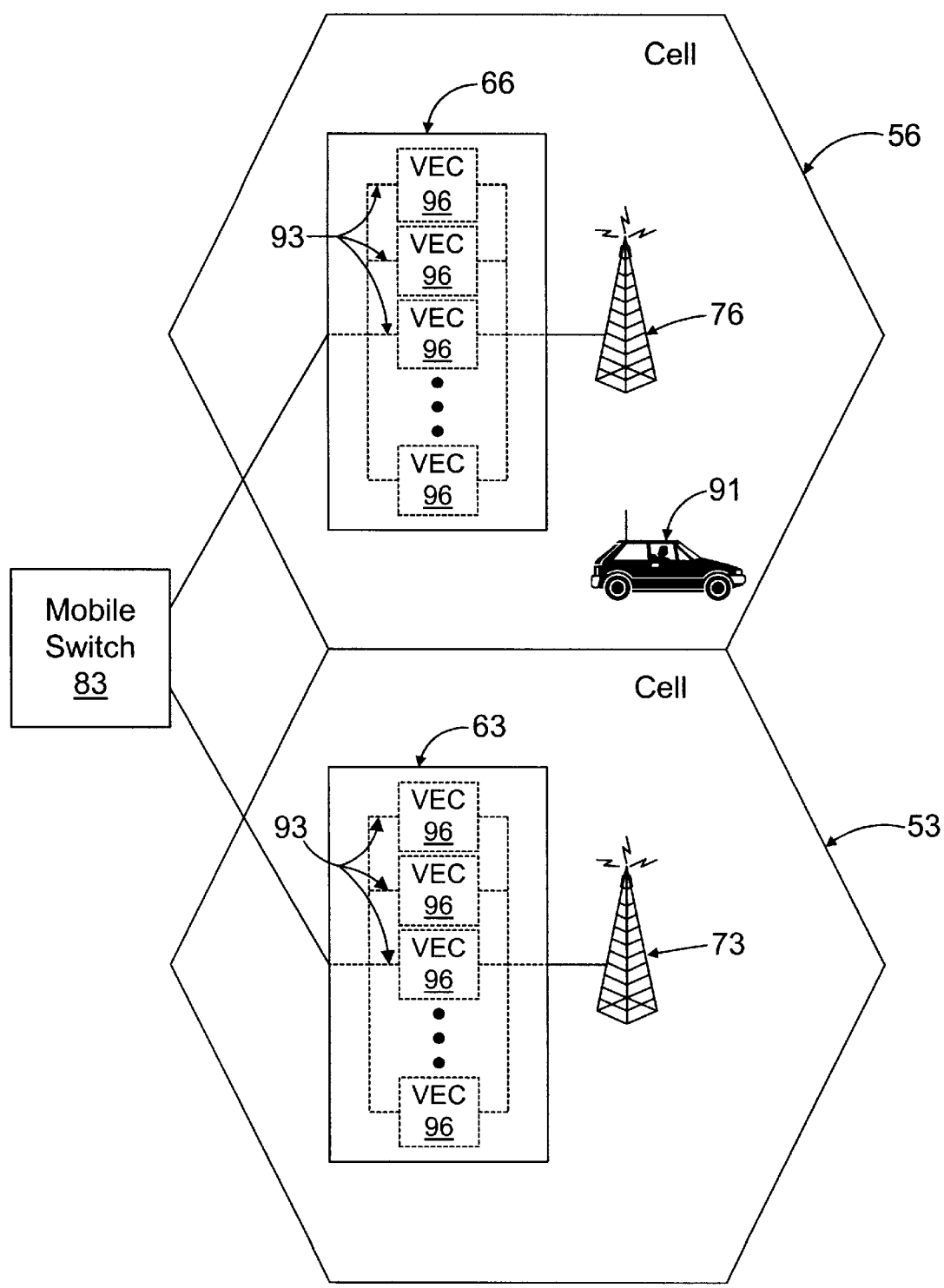
FIG. 2 is schematic diagram further illustrating voice echo canceler (VEC's) situated at each cell within the cellular network of FIG. 1.

Turning to FIG. 2, shown is the cellular network of FIG. 1 including cells 53 and 56, with cell sites 63 and 66 which are coupled to radio antennas 73 and 76, respectively. The cell sites 63 and 66 are coupled to the mobile switch 83. Within each cell site 63 and 66 are several channels 93 through which a cellular call can be linked. In some cellular network configurations, a voice echo canceler (VEC) 96 may be provided for each channel 93 to cancel echoes on the particular telephone call initiated, as is known in the art. It is assumed herein that the cellular network 51 is digital with the ability to handle analog cellular as well.

Each channel 93 is ultimately linked to a radio antenna 73 or 76 which establishes radio transmission to the mobile unit 91, as known in the art. A channel 93 working in conjunction with the radio transmission antenna 73 or 76 together are generally termed a "radio" in the cellular field. Thus, there are several radios within each cell site 63 and 66. Each channel 93, or radio, facilitates analog cellular communication on a different frequency as known in the industry.

At times, a cellular telephone call may experience interference due to physical obstruction or other phenomena while the mobile unit 91 is within a particular cell 53 or 56. In such a case, the call may be switched to a new channel 93 within the particular cell 53 or 56 that does not experience significant interference. Switching channels 93 within a particular cell 53 or 56 as such is also customarily referred to as a "handoff" in the cellular industry.

It is important to note that the radio transmission from the mobile unit 91 to a cell site 53 or 56 may be either analog or digital. Analog cellular transmission uses frequency modulation techniques which do not add appreciable delay to the overall signal. The actual frequencies used may vary and may also depend upon the call capacity of a particular cellular network. An example of analog transmission is that which transmits according to the Advanced Mobile Phone Service (AMPS). Due to the fact that oftentimes the delay is not significant, echo cancelers 96 normally are not brought on-line with analog communication, unless the call is over a long distance.

On the other hand, digital cellular transmission involves the process of digitizing and compressing the voice signal by the mobile unit 91 before transmission to a cell site 53 or 56 and vice versa. These digitizing and compression processes generally add significant delay to the transmission of the signal, resulting in a significant echo signal. Consequently, voice echo cancelers 96 are usually brought on-line to cancel echo signals created by this significant delay. Such digital cellular networks generally provide for analog cellular communication as well. The echo cancelers 96 that are brought on-line for digital cellular communication may also be employed in analog cellular communication as well.

Figure 3:
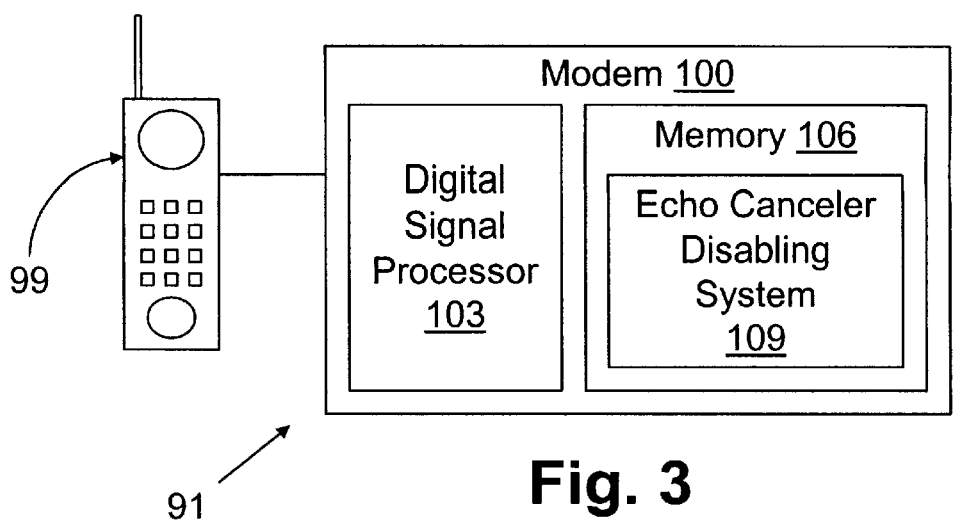
FIG. 3 is a block diagram illustrating a mobile unit according to the preferred embodiment of the instant invention.

Turning to FIG. 3, shown are the components that make up a mobile unit 91 according to the preferred embodiment of the present invention. The cellular telephone 99 is coupled to modem 100. The modem 100 will communicate a digital data signal to the cellular telephone 99 which, in turn, will transmit the digital data as a voice signal to be received by the cellular antennas 73, 76, and 79 (FIG. 1). Within the modem 100 are a digital signal processor 103 and memory 106. The digital signal processor 103 performs the various operations according to the instant invention based on the echo canceler disabling system 109 located in the memory 106. Note that the digital signal processor 103 and the memory 106 may be incorporated into a single integrated circuit as is known in the art.

In order to communicate with a second modem at the call destination device 89, for example, the modem 100 will synchronize its digital data transmission with the transmission of the second modem. According to the echo canceler disabling system 109, if at any time synchronization with the second modem is lost, the modem 100 will execute a retrain sequence in which the modem 100 reestablishes synchronization with the second modem. A "loss of synchronization" is defined herein as either a total loss of synchronization between the modems or a degradation of modem performance. The loss of synchronization may be caused, for example, by the introduction of an echo canceler on-line which will generally result in a complete disruption of digital data communication. Other transmission problems may also cause the disruption of digital data transmission resulting in the loss of synchronization.

When initiating a telephone call via modem 100, the cellular telephone 99 and the cell site 56 (FIG. 2) will perform predetermined handshaking routines in which the specific channel 93 (FIG. 2) to be used for communication is established. Once the call is established, the modem 99 will undergo a handshaking routine with the modem contacted at the call destination device 89 (FIG. 1) in which a 2100 Hz. tone is with phase reversals transmitted, disabling any echo cancelers that come on-line. This is done to prevent a voice echo canceler 96 from disrupting the digital data transmission.

Once digital data transmission from modem 100 to a second modem at the call destination device 89 is established, it is possible that the digital data transmission will be disrupted if a handoff occurs. In this regard, handoffs cause a new channel 93 to be established. When the new channel 93 is established, a new echo canceler 96 may be brought on-line which causes a loss of synchronization resulting in the complete disruption of digital data communication.

According to the preferred embodiment, when modem 100 loses signal synchronization, the digital signal processor 103 operating according to the echo canceler disabling system 109 reestablishes synchronization and digital data communication with the second modem by transmitting a retrain sequence. The retrain sequence includes an echo canceler disabling signal which will disable any echo cancelers which have been brought on-line after the handoff.

Figure 4:
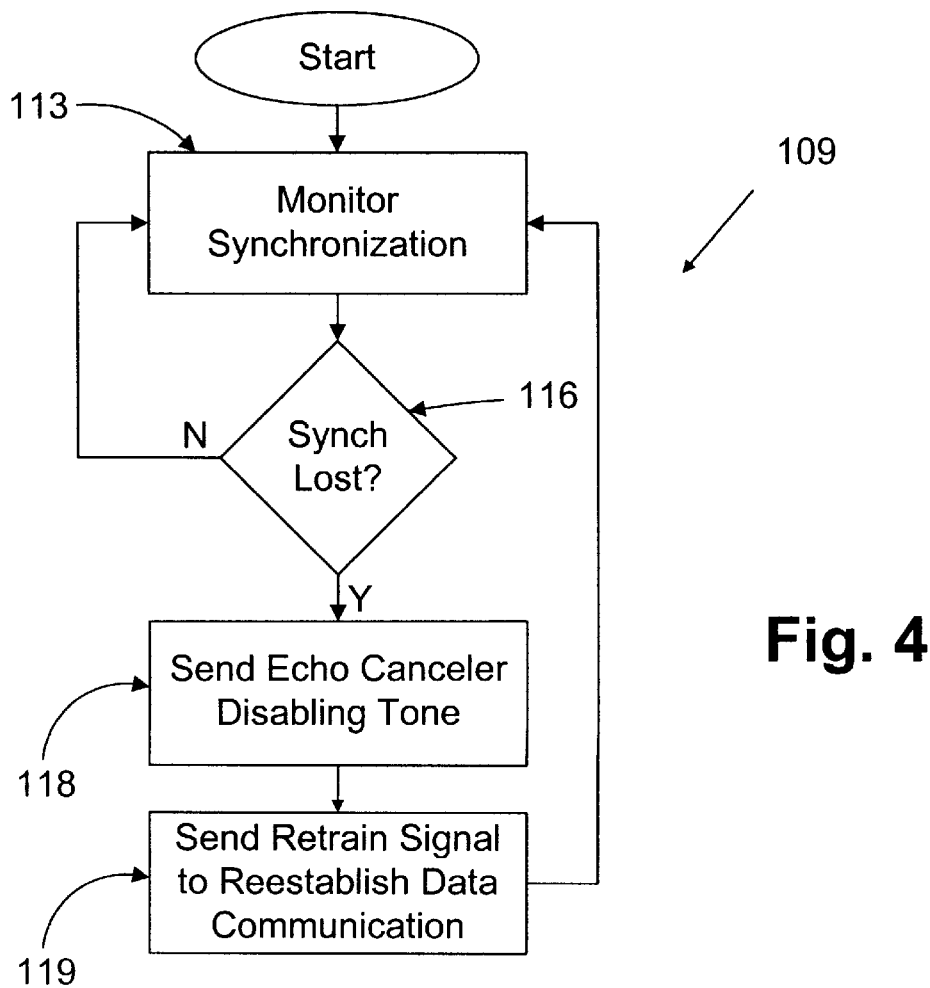
FIG. 4 is a flow diagram illustrating the architecture, functionality, and operation of the disabling echo canceler system of FIG. 3.

Turning to FIG. 4, a diagram of the flow of logic executed by the modem 100 (FIG. 3) is shown. In particular, the steps shown are preferably performed by the programmed digital signal processor 103 in the modem 100. Beginning with step 113, the modem 100 will constantly monitor for proper signal synchronization. In step 116, if the synchronization is not lost, the modem 100 will revert back to step 113.

According to the present invention, if synchronization is lost, as would be the case with a handoff, the logic will proceed to step 118 where an echo canceler disabling tone is transmitted. In the case of the preferred embodiment, the echo canceler disabling signal is a 2100 Hz. tone which is transmitted for 1000 milliseconds with 180 degree phase reversals every 450 milliseconds. Note that this tone will disable the echo cancelers that are brought on-line due to the occurrence of a handoff as previously discussed. After the 2100 Hz. tone is transmitted, in step 119, a retrain sequence is sent to reestablish synchronization and digital data transmission. The logical flow will then revert back to step 113 where the loop is repeated.

The 2100 Hz. tone with phase reversals every 450 milliseconds is the standardized signal that is employed to disable any echo canceler worldwide.

Figure 5A:
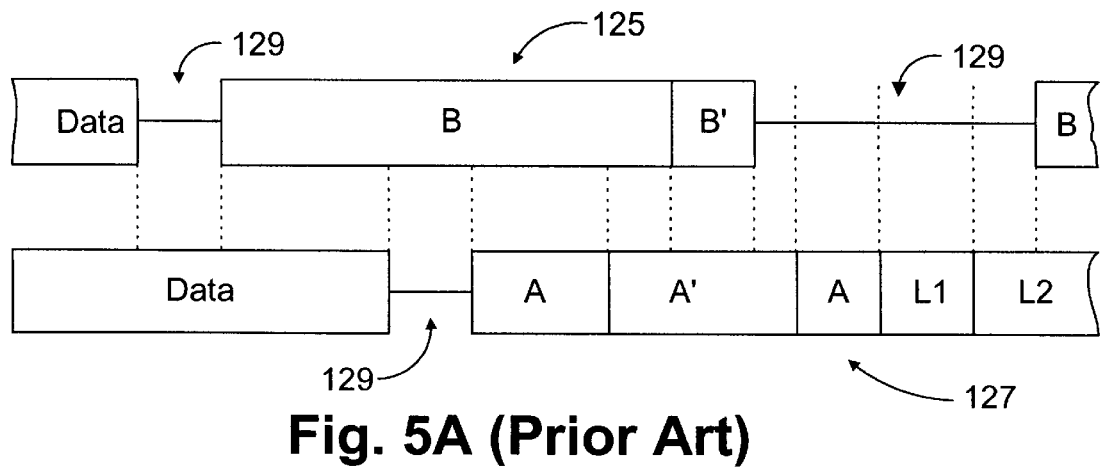
FIG. 5A is a schematic diagram of a prior art retrain sequence.

Turning now to FIG. 5A, shown is a retrain sequence of a call modem 125 and an answer modem 127 for a standard V0.34 modem according to the prior art. In FIG. 5A, the call modem 125 initiates the retrain sequence with a pause of silence 129, followed by a "B" tone. The answer modem 127 responds with a pause 129 and then an "A" tone followed by a phase reversal of the A tone denoted "A'". The call modem 125 responds with a phase reversal of the B tone denoted B'. Subsequent communication establishes the digital data link between the call modem 125 and the answer modem 127 by establishing timing and other parameters as known in the art. It should be noted that the sequence used in FIG. 5A for V0.34 modems is simply used as an example and is not a restriction of the preferred embodiment. This example is further illustrated in the International Telecommunications Union (ITU) draft recommendation V0.34 dated Oct. 16, 1997, the entire text of which is incorporated herein by reference. However, the principles discussed herein apply to any modem type.

Figure 5B:
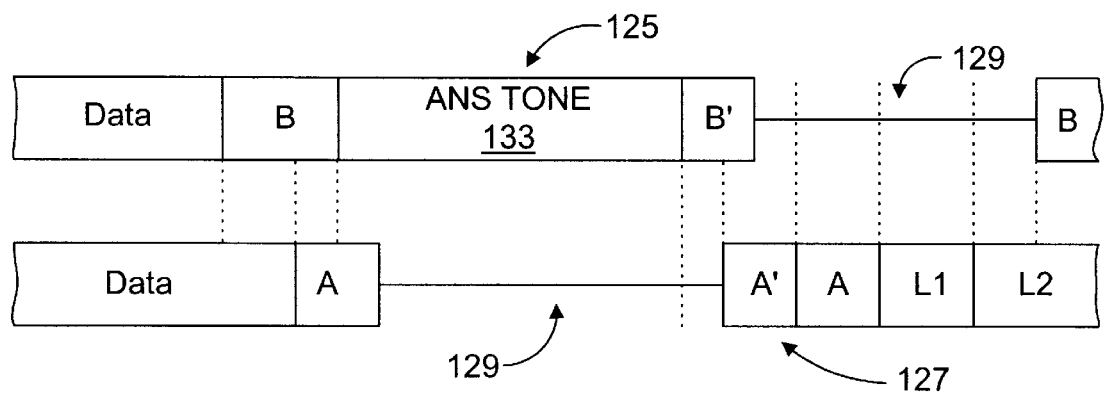
FIG. 5B is a schematic diagram of a retrain sequence used by the disabling echo canceler system of FIGS. 3 and 4.

Referring now to FIG. 5B, shown is a retrain sequence according to the preferred embodiment of the present invention. The sequence for the call modem 125 further includes the ANS Tone 133 which is the 2100 Hz. tone that disables voice echo cancelers.

According to the preferred embodiment of the present invention, the echo canceler disabling signal is transmitted with the retrain signal that is sent to reestablish modem communication after synchronization is lost. In addition to synchronization loss due to handoffs, it is possible that synchronization may be lost due to other transmission difficulty, in which case an echo canceler disabling signal would be sent even though no echo canceler is brought on-line. Although transmitting the signal with every retrain may not be necessary, the instant invention will in effect address virtually all of the unique problems presented with digital data communication using the cellular networks.

Alternatively, circuitry may be employed whereby the echo canceling tone is only sent during retrains resulting from loss of synchronization due to a handoff. Referring back to FIG. 3, it is important to note that the instant invention may be employed on an integrated cellular modem which combines the functions of the cellular telephone 99 and the modem 100. In such a case the operation of the integrated cellular modem would be substantially the same as that presented by the combination shown in FIG. 3. The primary difference would be that circuitry may be employed whereby the cellular components of an integrated cellular modem which communicate with a cell site in establishing a new channel would inform the modem circuitry of the impending occurrence of a handoff. In such cases, the modem would send an echo canceler disabling tone and a retrain immediately after the handoff before synchronization is lost, thereby ensuring rapid recovery of digital data transmission from a handoff. Also, it would be possible that independent cellular telephones 99 and modems 100 could communicate with each other in similar fashion. Such permutations of the instant invention are intended to be included herein.

It would be apparent to those skilled in the art that variations and modifications may be made to the embodiments of the invention discussed above which are within the spirit and principles of the invention. All such variations and modifications are intended to be included herein within the scope of the present invention, as defined by the following claims.

Now, therefore, we claim the following:

1. A system comprising:
   means for generating a voice echo canceler disable tone; and
   means for transmitting said echo canceler disable tone, wherein said transmitted voice echo canceler disable tone disables voice echo cancelers in a cellular network brought on-line after call startup due to a hand off of communication from a first communication channel to a second communication channel.

2. The system of claim 1 further comprising:
   circuitry to detect a loss of signal synchronization.

3. The system of claim 2, wherein said circuitry to detect a loss of signal synchronization further comprises a digital signal processor.

4. The system of claim 2, wherein said tone generator is responsive to circuitry that detects said loss of signal synchronization.

5. The system of claim 2, wherein said retrain signal is stored on memory within said modem.

6. The system of claim 2, wherein said echo canceler disable tone has a frequency corresponding to approximately 2100 Hertz.

7. The system of claim 4, wherein said means for generating a voice echo canceler disable tone further includes a tone generator, and wherein said transmitting means is configured to transmit a retrain signal to reestablish the system synchronization.

8. The system of claim 7, wherein said retrain signal is transmitted with said voice echo canceler disable tone.

9. The system of claim 7, wherein said retrain signal is transmitted after said voice echo canceler disable tone.

10. A system for disabling an echo canceler that is brought on-line after an initiation of a call, comprising:
    means for detecting a loss of signal synchronization;
    means for sending an echo canceler disable tone; and
    means for sending a retrain signal with or after said echo canceler disable tone to reestablish signal synchronization.

11. The system of claim 10, wherein the loss of signal synchronization occurs due to a handoff of a transmission signal in a cellular network.

12. A system for disabling an echo canceler that is brought on-line after an initiation of a call, comprising:
    modem circuitry capable of data transmission via a cellular network, said data transmission being accomplished by establishing signal synchronization with a second modem;
    circuitry to communicate the occurrence of a handoff to said modem circuitry, said handoff causing an introduction of an echo canceler on-line which causes a loss of signal synchronization; and
    a retrain sequence with an echo canceler disable tone, said retrain sequence being sent after the handoff to disable the echo canceler brought on-line in the cellular network after the handoff, thereby reestablishing signal synchronization.

13. A method for disabling an echo canceler activated on-line in a cellular network after call startup during digital data transmission, comprising the steps of:
    detecting a loss of signal synchronization in a modem;
    sending a retrain sequence to reestablish signal synchronization; and
    sending an echo canceler disabling tone with said retrain sequence to disable new echo cancelers brought on-line.

14. The method of claim 13, further comprising the step of storing said retrain signal with said echo canceler disabling tone in memory within said modem.

15. The method of claim 13, wherein the echo canceler disabling tone has a frequency of approximately 2100 Hertz.

* * * * *